Figure 2:
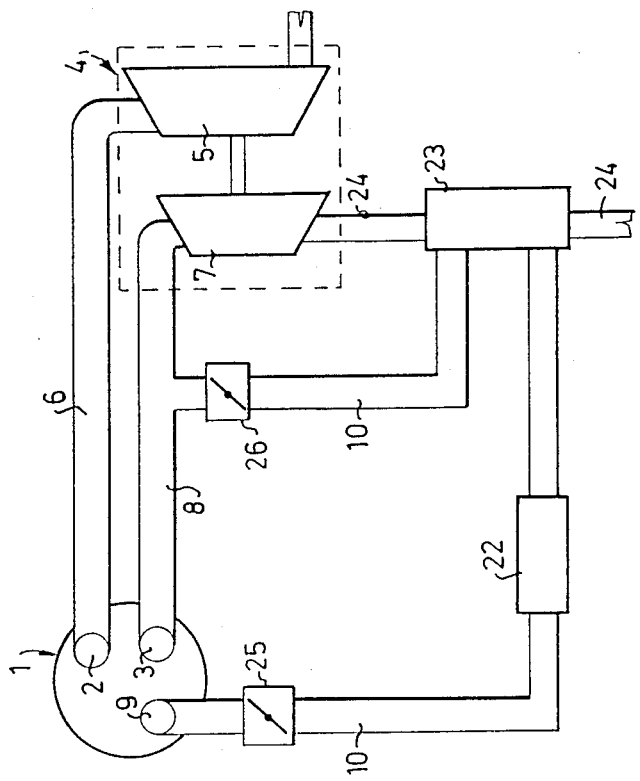

United States Patent [19]

Holmér

[11] Patent Number: 4,916,903
[45] Date of Patent: Apr. 17, 1990

[54] METHOD AND AN ARRANGEMENT FOR CONTROLLING THE WORKING CYCLE OF A TURBOCHARGED INTERNAL COMBUSTION ENGINE

[76] Inventor: Ernst Holmér, Tryggvegatan 10, S-41729, Göteborg, Sweden

[21] Appl. No.: 142,662

[22] Filed: Jan. 11, 1988

[30] Foreign Application Priority Data

Jan. 14, 1987 [SE] Sweden ................. 8700115

[51] Int. Cl.⁴ .................................. F02B 37/00
[52] U.S. Cl. ....................... 60/605.1; 60/606; 60/611; 123/316
[58] Field of Search ............ 60/605, 606, 611; 123/316

[56] References Cited

U.S. PATENT DOCUMENTS 2,773,490  12/1956  Miller ..................... 60/611
2,936,575  5/1960  Lieberherr ............... 60/611

FOREIGN PATENT DOCUMENTS 119922  7/1983  Japan ..................... 60/606
12128  1/1984  Japan ..................... 123/316

*Primary Examiner*—Michael Koczo

[57] ABSTRACT

The present invention relates to a method for controlling the working cycle of a four-stroke internal combustion engine which is supercharged by at least one exhaust-driven turbo-compressor (4), and also to an arrangement for carrying out the method. Each cylinder of the engine is provided with an inlet valve (2) to which the compressor (5) of the turbo-compressor (4) delivers air through an inlet pipe (6), and also with an outlet valve (3) from which gases are passed from the cylinder to the turbine (7) of the turbo-compressor (4) through an outlet pipe (8). According to the invention each cylinder is further provided with a pressure control valve (9) which is connected to the outlet pipe (8) by a pressure control line (10), between the outlet valve (3) and the turbine (7) of the turbo-compressor (4). The pressure control valve (9) is intended to open when the piston, during the compression stroke of the engine cycle, is located in the cylinder in a first predetermined position (D) at a distance from the bottom-dead-center position (C) of the piston, and is intended to close when the piston, during the compression stroke, is located in a second predetermined position (E) at a greater distance from its bottom-dead-center position. The air flowing through the pressure control line (10) can be heated in a heat exchanger (23) by hot exhaust gases downstream of the turbine (7) such as to recover heat from these exhaust gases.

9 Claims, 1 Drawing Sheet

METHOD AND AN ARRANGEMENT FOR CONTROLLING THE WORKING CYCLE OF A TURBOCHARGED INTERNAL COMBUSTION ENGINE

The present invention relates to a method for controlling the working cycle of a four-stroke internal combustion engine which is supercharged by means of at least one exhaust-driven turbo-compressor and also to an arrangement which is intended for carrying out the method.

The present day internal combustion engine is a highly reliable power source which has a relatively high efficiency. There are, however, several reasons why endeavours should be made to increase the efficiency of such engines. One reason originates from the desirability of reducing the proportion of harmful constituents contained by the exhaust gases which are generated when fuel is combusted in the engine, while another reason derives from the desirability of reducing fuel consumption and therewith enhance engine economy.

Supercharging has long been used as an instrument for increasing the efficiency of an internal combustion engine of a given size. Supercharging is achieved almost exclusively with the air of turbo-compressors incorporating exhaust-driven turbines which drive compressors for delivering pressurized air to the air-intake of an engine. The rapid development of turbo-compressors now enables engines to be supercharged at high supercharging pressures. Those pressures that can be achieved, however, are too high to be utilized in known engines, in view of the demands placed on the length of useful life and on the reliability of such engines.

For the purpose of increasing the thermal efficiency of an internal combustion engine, i.e. for the purpose of achieving a low specific fuel consumption, while at the same time reducing the amount of harmful constituents present in the exhaust gases, there has been proposed a method in which the exhaust valve of each engine cylinder is opened a second time during each engine, namely during part of the compression stroke of the piston. Such a method is described in U.S. application Ser. No. 885,708, filed July 15, 1986, now U.S. Pat. No. 4,815,423.

The object of the present invention is to provide a method and a system of the kind described in the introduction, which will enable the efficiency of an internal combustion engine to be further improved. The object is achieved in accordance with the invention by means of a method and an arrangement having the characteristic features set forth below.

Figure 1:
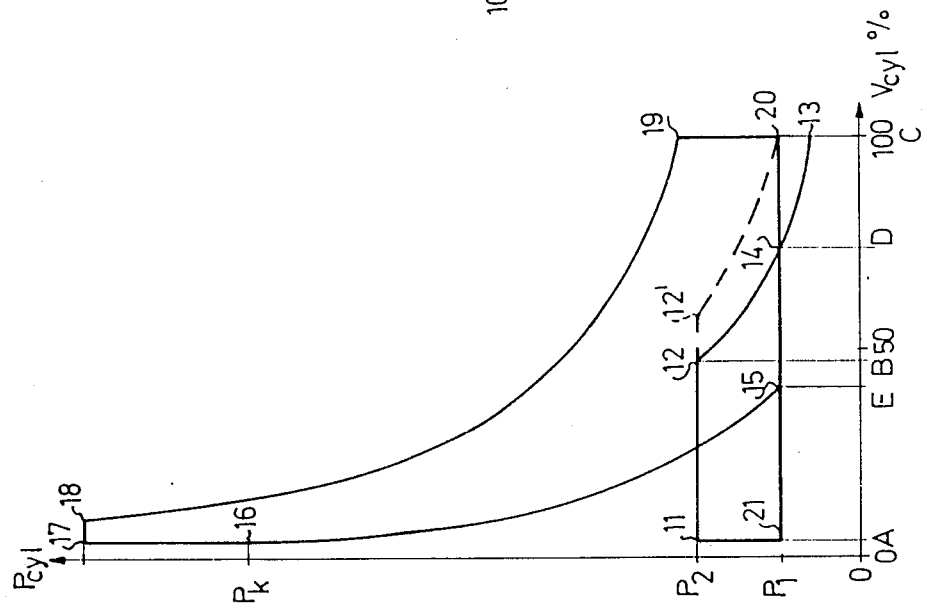

The invention will now be described in more detail with reference to the accompanying drawing, in which FIG. 1 is a schematic PV-diagram of an internal combustion engine which employs the method according to the invention, the diagram illustrating the conditions which prevail when the engine runs at a maximum load, and FIG. 2 illustrates schematically a cylinder of an internal combustion engine which is provided with an exemplifying embodiment of an arrangement according to the invention.

FIG. 1 illustrates the working cycle of a four-stroke supercharged internal combustion engine, said working cycle being controlled in accordance with the present invention. The diagram is schematic and is only intended to show the principles of the engine working cycle and then only the conditions which prevail at full engine load. An engine whose working cycle is controlled in accordance with the inventive method illustrated in FIG. 1 is illustrated in FIG. 2. Although the engine illustrated in FIG. 2 comprises only one cylinder, it will be understood that the invention can be applied to engines having any desired number of cylinders. Thus, each cylinder of the engine 1 is provided with a conventional inlet or induction valve 2 and an outlet or exhaust valve 3. The engine 1 is also provided with a turbo-compressor 4 which is driven by exhaust gases and which includes a compressor 5, this compressor being connected to the engine inlet valve 2 by means of an inlet pipe 6, for the purpose of delivering air under pressure to said valve. The turbo-compressor 4 includes a turbine 7 to which the exhaust gases deriving from the engine 1 are conducted through an outlet or exhaust pipe 8 arranged between the outlet valve 3 and the turbine 7. The exhaust gases thus drive the turbine 7, which in turn drives the compressor 5. It can also be mentioned in this regard that for the purpose of increasing the boosting or supercharging effect, there may be used two or more turbo-compressors with the respective compressors connected in series and with the respective turbines connected either in series or in parallel, depending on whether it is desired to utilize pulse-supercharging or constant pressure supercharging. The components described hitherto correspond to those used with known techniques applied in supercharged internal combustion engines.

In accordance with the invention, each cylinder of the engine 1 is provided with a pressure control valve 9, in addition to the inlet valve 2 and the outlet valve 3. The control valve 9 has connected thereto a pressure control line 10, which is in turn connected to the outlet pipe 8. As illustrated in FIG. 2, the pressure control line 10 has incorporated therein a multiple of individual devices. These devices will be described in greater detail hereinafter, although it will be understood that they are not imperative to the basic concept of the invention, since the prssure control line 10 can be connected directly to the outlet pipe 8.

The operation cycle illustrated in FIG. 1 of the engine illustrated in FIG. 2 is effected in accordance with the inventive method in the following manner: At the beginning of the induction stroke the inlet or induction valve 2 opens and air having a supercharge pressure of $P_2$ flows in through the valve 2 and into the cylinder while the piston moves from its top-dead-center position A to the position B, i.e. from point 11 to point 12 in the diagram. When the piston reaches position B, i.e. is located at point 12, the inlet valve 2 closes and, as the piston continues to move to its bottom-dead-center position C, the air in the cylinder expands adiabatically, from point 12 to point 13.

As the piston continues to move, i.e. during the compression stroke, there is first effected an adiabatic compression along the line 13-14. When the piston reaches position D, i.e. is located at point 14, the pressure control valve 9 opens, whereupon air at pressure $P_1$, which in this case corresponds to the pressure in the outlet pipe 8, is forced from the cylinder during movement of the piston to position E, which corresponds to the line 14-15. At position E the pressure control valve 9 again closes, whereafter the air present in the cylinder is compressed during continued movement of the piston to its position of top-dead-center A, i.e. the line 15-16. A compression pressure of $P_k$ is attained at the position A, i.e. at point 16.

Subsequent to the injection of fuel into the cylinder and to the ignition of said fuel at the top-dead-center position A of the piston, the line 16-17, and also to combustion of the fuel at constant pressure, the line 17-18, expansion of the gases takes place during the outward or working stroke of the piston, the line 18-19. At point 19, i.e. when the piston has reached its bottom-dead-center position C, the outlet valve 3 opens and a reduction in pressure at constant volume is obtained, the line 19-20.

As the piston moves inwards from its bottom-dead-center position C to its top-dead-center position A during the exhaust stroke, the waste gases are scavenged from the cylinder, the line 20-21. The outlet valve 3 then closes and the inlet valve 2 opens, resulting in an increase in pressure, the line 21-11. The working cycle is then complete and a new cycle begins.

The aforedescribed working cycle corresponds to the working cycle described in U.S. patent application Ser. No. 855,708 filed July 5, 1986, now U.S. Pat. No. 4,815,423, to which the reader is referred for a more detailed description of the engine working cycle at engine loads other than full engine loads, and also for information concerning the possibilities of modifying the working cycle, such as to adapt the same to different conditions.

The point at which the inlet valve 2 closes, i.e. point 12 in FIG. 1, can be mentioned as an example of those changes or modifications which can be made in this regard. The surface defined by points 11, 12, 14, 21, 11 in the diagram shown in FIG. 1 corresponds to the surplus or excess energy delivered by the turbo-compressor. The shape of this surface is determined by the point in time at which the inlet valve 2 closes. The most suitable latest valve closing time is designated 12' in the diagram. This is the point at which the subsequent adiabatic expansion, the broken line 12'-20, lowers the pressure to pressure $P_1$. The points 13, 20 and 14 therewith coincide. If the inlet valve 2 closes at a later point in time, the pressure prevailing in the cylinder when the pressure control valve 9 opens will exceed the pressure prevailing in the outlet pipe 8. Although subsequent expansion will take place in the turbo-compressor 4, in this particular case this subsequent expansion will result in a much lower efficiency than when expansion takes place in the cylinder.

The time at which the pressure control valve 9 is intended to close during the compression stroke, i.e. point 15, which corresponds to piston position E, is preferably selected so that in order to achieve the best efficiency from the energy delivered by the fuel subsequent to combustion, there is produced a pressure such that when the outlet valve 3 opens after the working stroke or outward stroke, i.e. at point 19, the flow velocity of the gases across the outlet valve 3 will correspond essentially to critical flow. This is not a requirement for carrying out the working cycle of the engine, but is only a recommendation for achieving the highest possible efficiency by preventing the occurrence of super-critical flow.

The pressure $P_1$, i.e. the pressure in the outlet pipe 8, can be changed by varying the extent to which the flow of exhaust gases is throttled, so as to change the compression pressure $P_k$ reached in the cylinder at the end of the compression stroke.

The throttling effect achieved across the inlet valve 2 may conveniently be adapted so that within a given engine speed, the air flow will lie within the limits of the top efficiency of the turbo-compressor 4.

The pressure control line 10 of the inventive arrangement illustrated in FIG. 2 incorporates an equalizing vessel 22 and a heat exchanger 23. The purpose of the equalizing vessel 22 is to provide a smoother air flow through the pressure control line 10. The heat exchanger 23 is intended for an exchange of heat between the gas present in the pressure control line 10 and the gas present in an outlet pipe 24 extending from the turbine 7 of the turbo-compressor 4. This enables the gas flowing in the pressure control line 10 to take up heat from the exhaust gases leaving the turbine 7 of the turbo-compressor 4, which means that energy is taken from these exhaust gases and delivered to the outlet pipe 8 at a location upstream of the turbine 7. In this way energy which would otherwise be lost through the exhaust gases is taken up by the gas in the pressure control line 10 and returned to a location upstream of the turbine, which results in an enhanced total efficiency of the engine 1, as a result of an increased positive gas exchange function.

The pressure control line 10 of the inventive arrangement illustrated in FIG. 2 also incorporates a control valve 25, which is located close to the pressure control valve 9. The flow exiting from the cylinder through the pressure control valve 9 can be changed with the aid of the control valve 25 such as to render the pressure control valve 9 more or less inactive. This may be advantageous when increasing the engine power rapidly from a low engine load, since the amount of air enclosed in the cylinder increases, which allows the combustion of a larger quantity of fuel. There is no risk of the engine 1 being overloaded as a result of an excessively high pressure in the cylinder, since under these conditions the pressure in the outlet pipe 8 is low, which means that the degree of boost or supercharging is also low, i.e. the pressure in the outlet pipe 6 is low. Throttling of the flow with the air of the control valve 25 will also greatly facilitate the cold-start ability of the engine 1 and will lower the hydrocarbon content of the exhaust gases, due to the higher compression ratio achieved.

Another method of changing the flow exiting from the cylinder through the pressure control valve 9 is to change the time at which the pressure control valve closes. This involves displacing the point 15 in the FIG. 1 diagram, i.e. displacement of the piston position E in the cylinder. This will result in a change in the compression ratio in the cylinder and, at the same time, in a change in the amount of gas that is enclosed in the cylinder at the beginning of the compression stroke. This is effected totally without influencing the expansion ratio during the working stroke of the piston.

As will be seen from FIG. 2, the pressure control line 10 also incorporates a valve 26 in the proximity of the point at which said line joins the outlet pipe 8. The valve 26 is intended to close synchronously with the control valve 25. When the valve 26 is closed, the volume between the outlet valve 3 and the turbine 7 is limited, which enables pressure pulses in the exhaust gases to reach the turbine 7 more easily, and to deliver their energy thereto more readily. This will increase the power of the turbo-compressor 4 and also enhance the extent to supercharging, i.e. will result in a higher pressure in the inlet pipe 6, which is particularly beneficial at low engine speeds.

The present invention is not limited to the aforedescribed embodiments, since modifications can be made within the scope of the following claims.

I claim:

1. A method for controlling the working cycle of a four-stroke internal combustion engine (1) which engine is supercharged by means of at least one exhaust-driven turbo-compressor (4) and each cylinder of which is provided with at least one inlet valve (2) to which the compressor (5) of the turbo-compressor (4) delivers air through an inlet pipe (6), and also provided with at least one outlet valve (3) from which exhaust gases are conducted through an outlet pipe (8) to the turbine (7) of the turbo-compressor (4), said engine being further provided with a pressure control valve (9) connected to the outlet pipe (8) by means of pressure control line (10), said method comprising the steps of opening and closing the outlet valve (3) during the exhaust stroke of said engine cycle, opening the pressure control valve (9) during the compression stroke of said piston when said piston is positioned at a predetermined position (D) in the cylinder at a distance from the bottom-dead-center position (C) of the piston, closing the pressure control valve (9) when said piston during said compression stroke is positioned at a second predetermined position (E) at a further distance from the bottom-dead-center position (C) of said piston, opening the inlet valve (2) when said piston is positioned in the vicinity of its top-dead-center position (A) subsequent to the exhaust stroke of said cycle, closing the inlet valve (2) during the induction stroke of said cycle when said piston is positioned in a third predetermined position (B) at a distance from its top-dead-center position (A) and spaced from its bottom-dead-center position (C).

2. The method of claim 1 further comprising varying the flow of said exhaust gas in said pressure control line (10) in order to modify the compression pressure ($P_k$) reached in said cylinder at the end of the compression stroke as well as to control the amount of air in said cylinder.

3. The method of claim 1 further comprising controlling the flow of air to inlet valve (2) in response to engine speed to maintain said air flow within an optimum range of efficiency for said turbo-compressor.

4. The method of claim 1 further comprising varying the point of time at which said pressure control valve (9) is closed in order to change the compression ratio or the amount of air in said cylinder.

5. An apparatus for controlling the working cycle of a four-stroke internal combustion engine (1) which engine is supercharged by means of at least one exhaust-driven turbo-compressor (4) and each cylinder of which is provided with at least one inlet valve (2) to which the compressor (5) of the turbo-compressor (4) delivers air through an inlet pipe (6), and also provided with at least one outlet valve (3) from which exhaust gases are conducted through an outlet pipe (8) to the turbine (7) of the turbo-compressor (4), said engine being further provided with a pressure control valve (9) connected to the outlet pipe (8) by means of pressure control line (10), said apparatus comprising means to open and close the outlet valve (3) during the exhaust stroke of said engine cycle, means to open the pressure control valve (9) during the compression stroke of said piston when said piston is positioned at a predetermined position (D) in the cylinder at a distance from the bottom-dead-center position (C) of the piston, means to close the pressure control valve (9) when said piston during said compression stroke is positioned at a second predetermined position (E) at a further distance from the bottom-dead-center position (C) of said piston, means to open the inlet valve (2) when said piston is positioned in the vicinity of its top-dead-center position (A) subsequent to the exhaust stroke of said cycle, and means to close the inlet valve (2) during the induction stroke of said cycle when said piston is positioned in a third predetermined position (B) at a distance from its top-dead-center position (A) and spaced from its bottom-dead-center position (C).

6. The apparatus of claim 5 further comprising an additional pressure control line (10) extending between outlet pipe (8) and an outlet pipe (24) extending from said turbine (7).

7. The apparatus of claim 5 further comprising heat exchange means (23) connected to each said pressure control line for heat exchange between gas in each said pressure control line and gas discharged from said turbine (7) in outlet pipe (24).

8. The apparatus of claim 5 wherein said pressure control line (10) connected to said pressure control valve (9) further includes gas flow equalizing means.

9. The apparatus of claim 5 further comprising valve means (25) to control the flow of exhaust gas in said pressure control line (10) in order to modify the compression pressure ($P_k$) reached in said cylinder at the end of the compression stroke as well as to modify the amount of air in said cylinder.

* * * * *